United States Patent

Struble et al.

[11] 3,910,782
[45] Oct. 7, 1975

[54] BAFFLE TYPE GREASE FILTER

[75] Inventors: Robert W. Struble, Yardley, Pa.; John T. Eckstine, Eatontown, N.J.

[73] Assignee: Buildex Incorporated, Jericho, N.Y.

[22] Filed: Sept. 27, 1973

[21] Appl. No.: 401,318

[52] U.S. Cl. ............ 55/444; 55/464; 55/418; 55/DIG. 36; 98/115 K
[51] Int. Cl.² ................................ B01D 45/00
[58] Field of Search ............ 55/422, 439, 440, 442, 55/443, 444, 445, 446, 462, 464, 465, DIG. 18, DIG. 36, DIG. 37, 434, 418; 98/115 K, 121 R

[56] References Cited
UNITED STATES PATENTS

| | | | |
|---|---|---|---|
| 722,272 | 3/1903 | Baker | 55/444 X |
| 2,862,437 | 12/1958 | Smith et al. | 55/DIG. 36 |
| 3,366,013 | 1/1968 | Madl, Jr. | 98/115 R X |
| 3,566,585 | 3/1971 | Voloshen et al. | 55/443 X |

FOREIGN PATENTS OR APPLICATIONS

| | | | |
|---|---|---|---|
| 1,048,157 | 7/1953 | France | 55/442 |
| 41,906 | 8/1907 | Switzerland | 55/422 |
| 699,760 | 11/1953 | United Kingdom | 55/444 |
| 841,277 | 7/1938 | France | 55/446 |

Primary Examiner—Frank W. Lutter
Assistant Examiner—David L. Lacey
Attorney, Agent, or Firm—Wolder & Gross

[57] ABSTRACT

An air entrained grease separator unit includes transversely spaced parallel longitudinally extending upstream first baffle members and transversely spaced parallel longitudinally extending downstream baffle members similar to and interdigitating the upstream baffle members and oppositely oriented. Each of the baffle members is V-shaped, the legs of which terminate in inwardly directed coplanar flanges. The apices of the upstream elements face upstream and the legs of adjacent members delineate inlet passages which converge to downstream throats, and the apices of the downstream members face downstream, and the legs of adjacent members delineate outlet passages which diverge from upstream throats. The flanges of the upstream members slightly overlap and are located upstream of the respective flanges of the downstream members to delineate intermediate passage between the inlet and outlet passage. A grid of transversely spaced parallel longitudinal bars which medially register with the inlet passage is adjustable toward and from the passage throats to adjust the air flow speeds.

10 Claims, 9 Drawing Figures

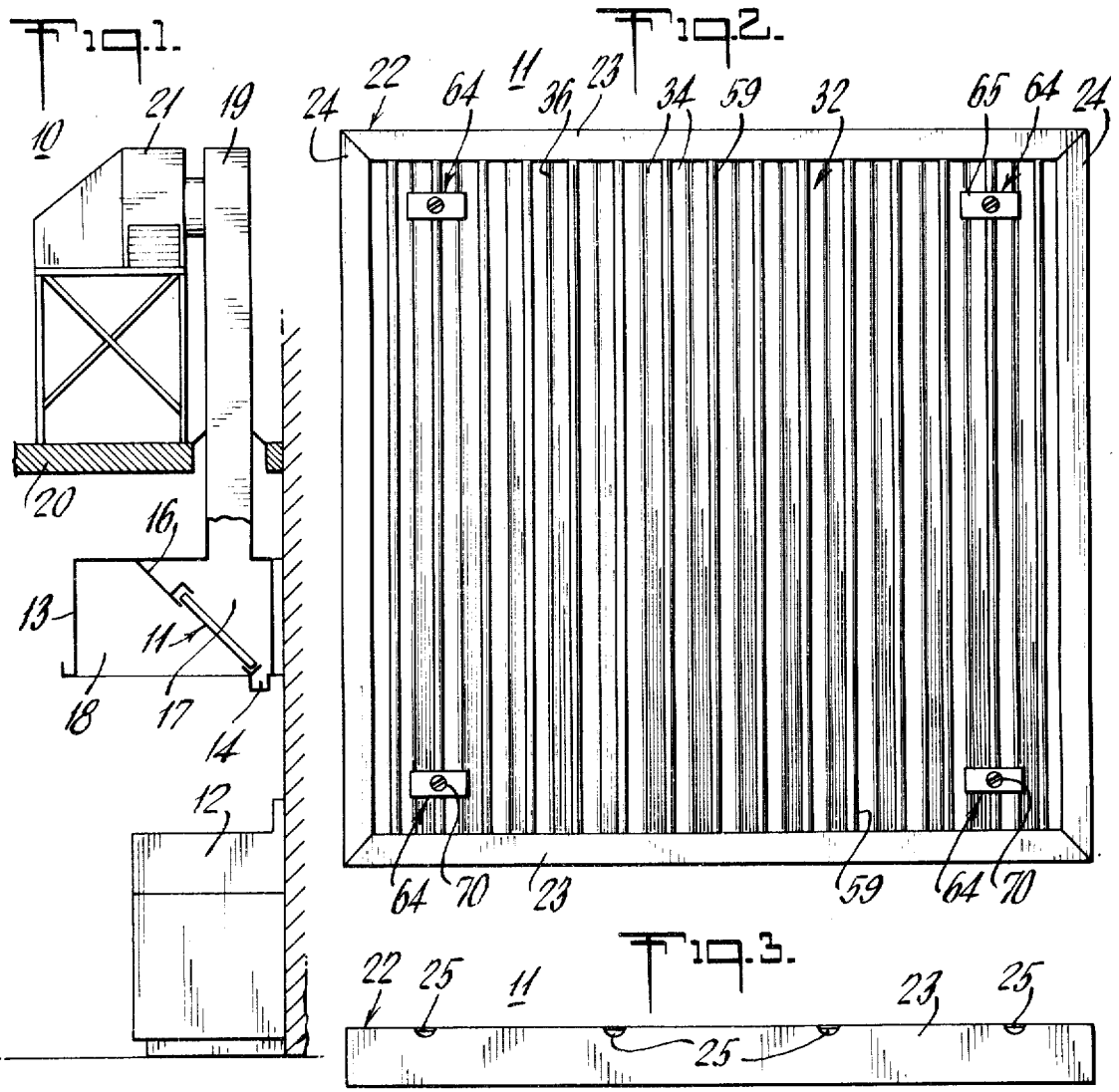
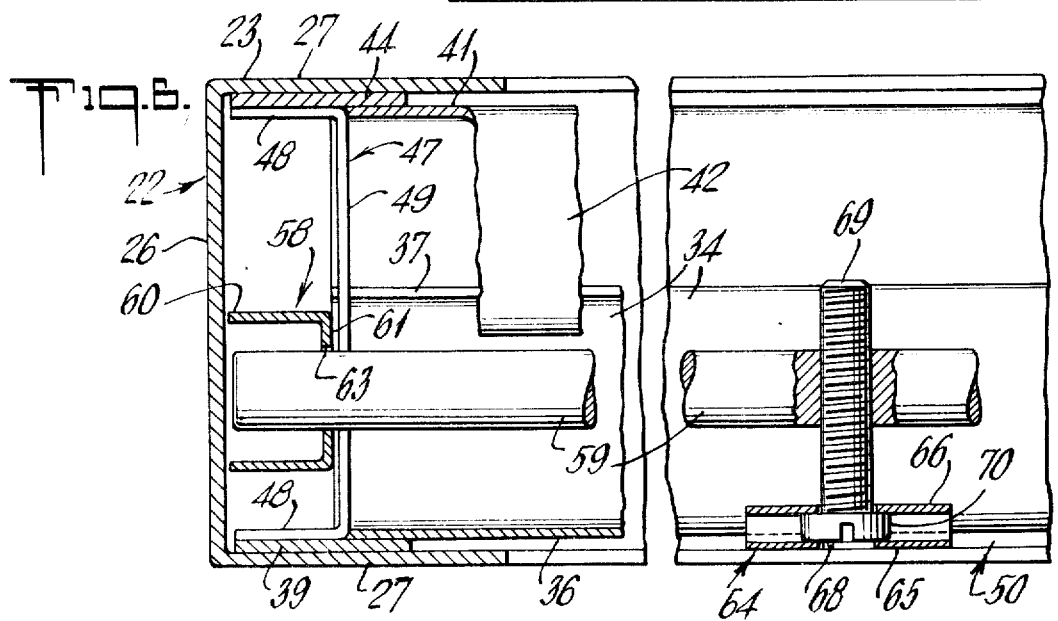

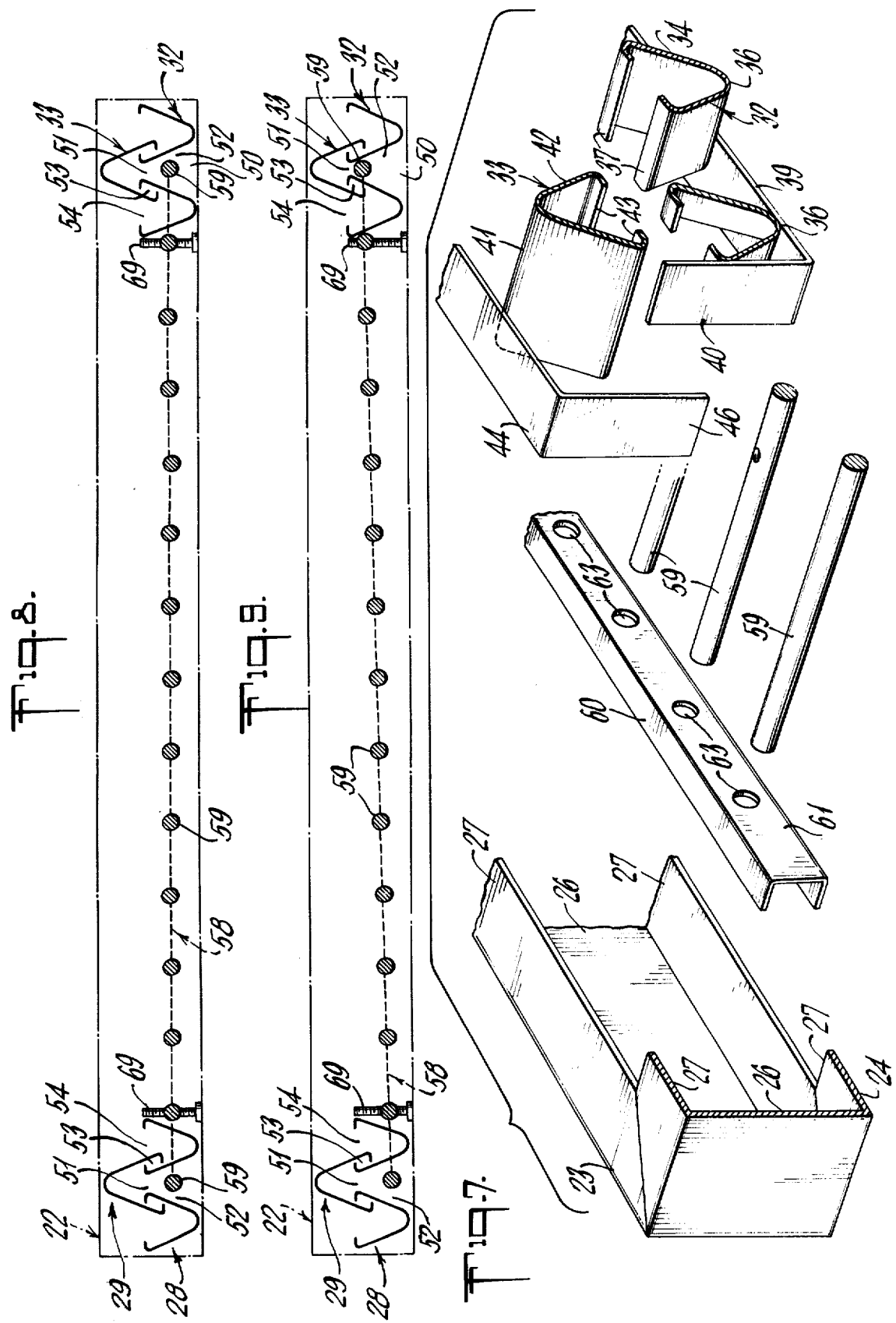

BAFFLE TYPE GREASE FILTER

BACKGROUND OF THE INVENTION

The present invention relates generally to improvements in filter devices, and it relates more particularly to an improved device for separating entrained grease from a flow of air.

Many occupied and work areas, as typified by commercial kitchens in which frying, deep frying and other similar procedures are practiced, are exposed to a grease laden atmosphere, whose continued presence is highly unsanitary and hazzardous, due to the deposition and condensation of the grease on the exposed surfaces, the inhalation of the greases entrained air which represents a dangerous pollutant, and the increased likelihood of fire. In order to reduce the presence of grease in the work area, it is forced air ventilated, a suction draft being established in the grease emitting areas. However, this expedient, as such, merely results in the spreading of the greases in areas external to the ventilated area and many of the hazzards are merely shifted from one area to another. To avoid this, a filter is generally positioned in the vented force flow of air from the work areas to catch and retain the grease. A mesh type filter is commonly employed, and although it is highly efficient in the removal of the grease, the grease accumulates in the filter which is exposed to the high velocity air flow and greatly increases the fire hazzards, since not only is the start of a fire not visible from the work area, but by reason of the air flow, an extremely hot fire blast is produced which is shortly out of hand before it can be contained. In order to avoid the drawbacks of the mesh type filter, many baffle type grease filters have been available and proposed. However, these filters possess numerous disadvantages. They are highly inefficient, difficult to adjust and maintain, are of little versatility and adaptabilty, and otherwise leave much to be desired.

SUMMARY OF THE INVENTION

It is a principal object of the present invention to provide an improved filter device.

Another object of the present invention is to provide an improved filter device for separating entrained grease from a stream of air.

Still another object of the present invention is to provide an improved grease removing air filter device of the baffle type.

A further object of the present invention is to provide a filter device of the above nature characterized by its high efficiency, reliability, ease of application, adjustment and servicing, ruggedness, low cost and great versatility and adaptability.

The above and other objects of the present invention will become apparent from a reading of the following description taken in conjunction with the accompanying drawings which illustrate a preferred embodiment thereof.

In a sense, the present invention contemplates the provision of a filter device for removing grease entrained in an air stream flowing forwardly in a direction from upstream to downstream comprising a first set of laterally spaced longitûdinally extending pairs of laterally spaced baffle sections converging in a forward direction, and delineating inlet passages having enlarged rear openings and reduced outlet throats, the sections of each inlet passage defining a pair terminating in relatively outwardly laterally projecting first flanges, and a second set of laterally spaced longitudinally extending pairs of laterally spaced second baffle sections delineating outlet passages having rear inlet openings interdigitating the inlet passages and forward outlets, the second sections of each outlet passage defining a pair terminating in laterally outwardly projecting second flanges spaced rearwardly of the first flanges and delineating therewith, and the proximate portions of the first and second baffle sections sinuous intermediate passages interconnecting the inlet and outlet passages. Another feature of the improved structure is the provision of longitudinally extending valve members medially located in the inlet passages and forwardly and rearwardly movable therein, to vary the respective inlet passage openings.

In the preferred form of the subject filter, a first set of laterally spaced V-shaped first baffle members, whose legs terminate in inwardly directed coplanar flanges are joined by a cross piece and a second set of laterally spaced inverted V-shaped second baffle members, whose legs terminate in inwardly directed coplanar inwardly directed flanges, and are likewise joined by a cross piece. The sets of baffle members are supported by a frame in interdigitating relationship with the flanges of the two sets being spaced and slightly overlapping. A rectangular grid includes longitudinal throttle bars medially registering with the inlet passages delineated by the confronting legs of adjacent baffle members, and the set of rods is forwardly and rearwardly adjustable, and is angularly adjustable.

It has been found that the present improved filter possesses a grease removing efficiency of 50 to 100% greater than that of baffle filters of the subject type heretofore available, with little increase in power requirements. It is believed that such radical efficiency increase is achieved by reason of the high air flow velocity achieved in the inlet passage throats which advantageously have a transverse cross section not exceeding one half of that of the inlet opening, and the unique sinuous passages interconnecting the inlet and outlet passages and their relationships. Further, the sharp changes in direction and velocity of the air stream are not followed by the entrained grease which strike the baffles surfaces on which it is retained to coagulate and flow to an outlet. In addition, air vortices are also established which also contribute to the movement of the entrained grease outwardly to impinge on the baffles. The improved filter is rugged, reliable, highly versatile and adaptable, and easy to service and maintain, and functions as a highly reliable flame barrier.

BRIEF DESCRIPTION OF THE DRAWINGS

FIG. 1 is a side elevational view, partially in section of a kitchen ventilating installation, employing filter units embodying the present invention;

FIG. 2 is a bottom plan view of the improved filter unit;

FIG. 3 is a lower end view thereof;

FIG. 6 is a sectional view taken along line 6—6 in FIG. 4;

FIG. 7 is a fragmentary exploded perspective view thereof;

FIG. 8 is a diagrammatic transverse sectional view thereof, illustrating the filter in a uniformly intermediate throttle condition; and FIG. 9 is a view similar to FIG. 8 illustrating the filter in a varied throttle condition.

DESCRIPTION OF THE PREFERRED EMBODIMENT

Figure 4:
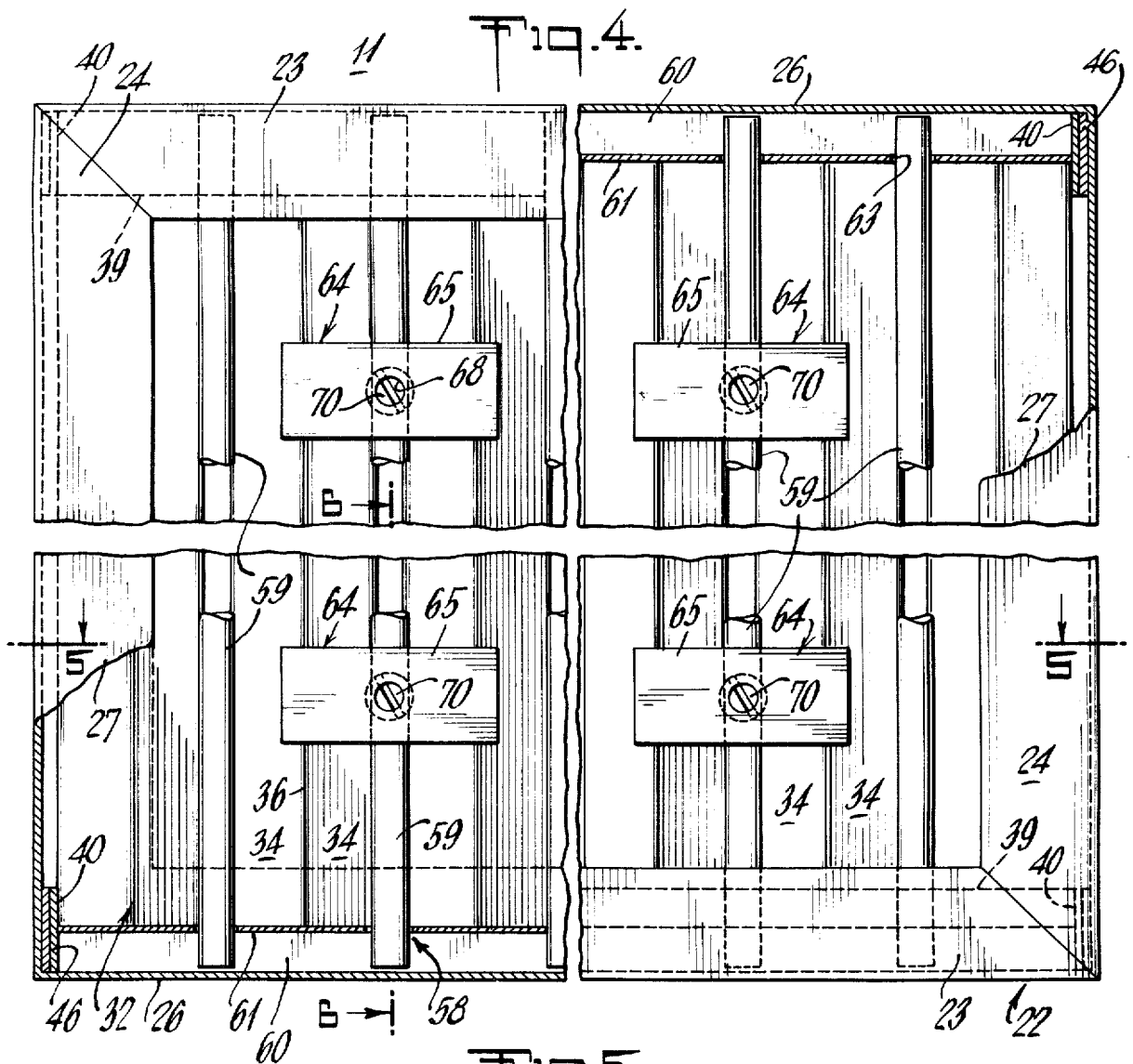
FIG. 4 is an enlarged fragmentary bottom plan view thereof, partially in section.
Figure 5:
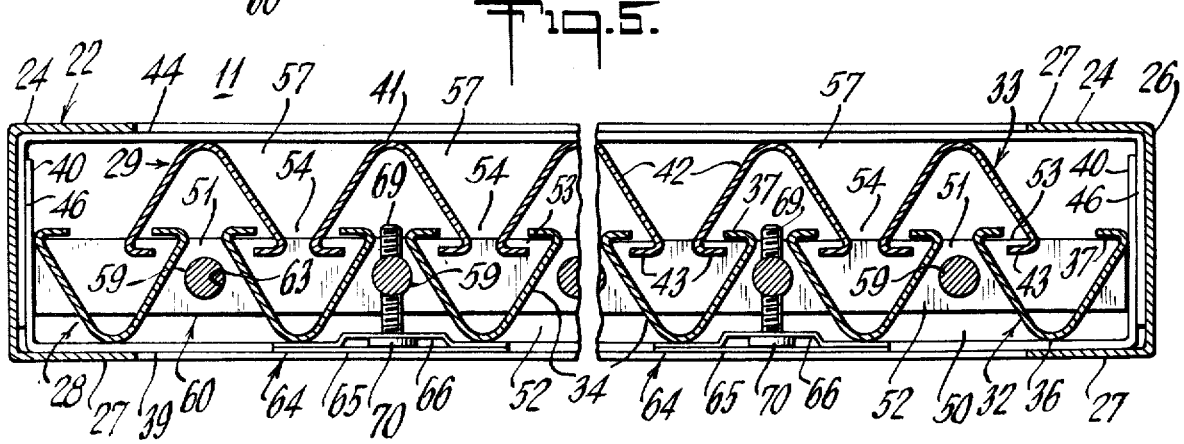
FIG. 5 is a sectional view taken along line 5—5 in FIG. 4.

Referring now to the drawings which illustrate a preferred embodiment of the present invention, the reference numeral 10 generally designates a ventilating installation used in a kitchen, by way of example, and employing one or more of the improved filter units or devices 11. The installation 10 is employed for venting the grease laden air from the space above a grease evolving stove 12, and for separating and removing the grease from the venting air and includes an open bottomed hood venting hood 13, disposed above and projecting beyond the stove 12 and extending for at least the width thereof. A laterally extending grease receiving trough 14 extends horizontally along the bottom rear border of hood 13. The hood 13 is divided by one or more side by side rectangular filter units 11 replaceably supported in forwardly, upwardly inclined positions by a similarly inclined upper panel 16 extending from the hood top wall and terminating at its bottom in a filter unit engaging channel, and a laterally extending angle member located along the front edge of the trough 14 into a rear plenum chamber 17 and a forward suction or venting section 18. A vertical duct 19 extends medially from the plenum chamber 17 through a roof 20 to the suction of inlet port of a suitable motor driven blower 21, mounted by a support frame on roof 20 and discharging into the atmosphere.

The filter unit 11 comprises a rectangular frame 22 including top and bottom parallel end legs 23 and parallel side legs 24, each of the legs 23 and 24 being channel shaped and including an outer cross web 26 and inwardly directed opposite parallel side webs 27 perpendicular to cross web 26. Formed in the bottom outer edges of frame legs 23 are longitudinally spaced drain openings 25. The frame 22 supports a pair of cooperating upstream or lower trailing and downstream or upper leading baffle sets 28 and 29 respectively, of a plurality of upstream baffle members 32 and a plurality of downstream baffle members 3. The baffle members 32 and 33 are of similar configuration, but oppositely oriented, and are interrelated as will be hereinafter described.

Each of the baffle members 32 extends longitudinally from front to rear, and is in the form of a V-shaped channel, including opposite baffles or panels 34 diverging upwardly or downstream from a lower rounded apex 36. The upper longitudinal edges of panels 34 terminate in relatively inwardly directed coplanar flanges 37. The baffle members 32 are regularly transversely spaced and joined at their apices 36 by a pair of laterally extending cross pieces 39 suitably secured, such as by welding, to the apices 36 at the opposite thereof. Each cross piece 39 terminates at the opposite ends thereof in upwardly directed parallel legs 40.

The baffle set 29 includes the longitudinal baffle members 33 regularly transversely spaced at intervals equal to the spacing intervals of baffle members 32, each baffle member 33 includes a rounded longitudinal apex and downwardly diverging panels or baffles 42 terminating in relatively inwardly directed coplanar flanges 43. The baffle members are joined at the ends of apices 41 by transverse cross pieces 44, terminating in depending legs 46.

The frame 22 supports the assembled baffle sets 28 and 29, the cross pieces 39 engaging the inside faces of the bottom side webs 27 of frame end legs 23, and the cross pieces 44 engaging the inside faces of the top side webs 27 of frame end legs 23 proximate the respective cross webs 26. Longitudinally separated spacer members 47 are disposed within channel legs 23 and include parallel longitudinal end arms 48 engaging the confronting faces of the outer borders of cross pieces 39 and 44 and are joined by a cross arms 49.

In the assembled condition of filter unit 11, the baffle members 32 and 33 are positioned by the respective cross pieces 39 and 44, so that they are mutually interdigitating with the successive baffle members 32 and 33 being medially disposed between successive baffle members 33 and 32 respectively. The baffles 34 of adjacent baffle members 32 converge from an enlarged upstream inlet opening 50 to a restricted throat 51 and delineate an inlet passage 52, the throat terminating in the space delineated by a respective aligned baffle member 33. The flanges 37 projecting from the panels 34 and bordering the outlet of each throat 51, are transversely, outwardly directed relative to the respective throats 51 and the proximate flanges 43 of each respective baffle member 33 are located below, and are outwardly offset and slightly overlapping of flanges 37 and delineate sinuous intermediate passages 53 connecting inlet passages 52 by way of the chambers delineated by respective baffle members 33 to outlet passageways 54 delineated by adjacent baffles 42 of successive baffle members 33. The outlet passages have restricted upstream throats and enlarged discharge or outlet openings 57.

A mechanism is provided for adjustably throttling or restricting the inlet passages 52, in order to compensate for differences in pressures in different parts of the plenum chamber 17 and comprises a rectangular grid 58, including laterally spaced longitudinally extending parallel circular rods 59 which are supported at their ends by laterally extending channel members having inner cross webs 61 provided with circular openings 63 engaged by rods 59. The center to center spacing between rods 59 is equal to the center to center spacing between inlet passages 52. The legs of channel members 60 are outwardly directed and the channel members 60 register with and extend along the lengths of channel frame legs 23 between the cross webs 26 and cross piece end legs 40 and 46, and are transversely slideable therein and angularly adjustable.

Located on the underface of filter unit 11 proximate and inwardly of each of the corners of frame 22 are support brackets 64, each of which extends between and is suitably secured to the apices 36 of a corresponding pair of adjacent baffle members 32. Each of the support brackets 64 includes a bottom plate 65 and an upper plate 66 disposed above and parallel to plate 65 and secured thereto by laterally spaced wings joined to plate 66 by integrally formed interconnecting legs and overlying and secured to plate 65. Axially aligned centrally located openings 68 are formed in plates 65 and 66. An adjusting screw 69 includes a head 70 rotatable and sandwiched between each pair of plates 65 and 66 and being accessible through lower opening 68. The threaded shank of each screw 69 projects through the opening in respective plate 66 and engages a threaded vertical bore in an overlying rod 59.

By turning a selected screw 69, by means of a screw driver engaging a respective screw head 70 through a bottom opening 68, the corresponding corner of the grid 58 may be adjustably raised or lowered to raise or lower the throttle rods 59 in the area of the respective grid corner to thereby respectively increase and decrease the throttling of corresponding portions of corresponding inlet passages 52. By turning the screws 69 so that the grid 58 is at a level parallel to frame 22, as shown in FIG. 8, the inlet passages 52 are similarly throttled and uniformly along their lengths and the throttling may be uniformly adjusted by turning screws 69 in the same directions by equal amounts. If only one pair of screws are turned, for example, the pair along a side of the frame 22 as shown in FIG. 9, the grid 58 is laterally relatively inclined to increase or decrease the throttling of the inlet passages 52 by uniform increments from one side to the opposite side of the filter unit 11. The inclination of the grid 58 may be adjusted along the lengths of rods 59 to correspondingly vary the throttling of the inlet passages 52 along their lengths by adjusting a pair of screws 69 along a frame leg 23. Thus, the throttling of the inlet passages 52 may be universally adjusted by turning one or more screws 69.

In the operation of the filter unit 11, the blower 21 draws air by way of duct 19 and plenum chamber 17 through the filter unit 11. The grease laden air flows from the space over the stove 12 through the inlets 50, passages 52, throats 51, the baffle members 33 through sinuous intermediate passages 53 and outlet passages 54 into plenum chamber 17. As the air traverses the passages 52, which are of the nature of venturis, high velocity streams are achieved at the throats 51 and while the low mass air turns sharply to enter intermediate passages 53, much of the high mass entrained grease droplets by reason of their relatively high mass and momentum deviate little from their initial pass and strike baffles 42 where they condense and coagulate and flow along the baffle surfaces into the trough defining baffle members 32, such flow being assisted by the air stream. Grease which is still entrained in air entering passages 53, and which traverses a high velocity sinuous paths in passages 53, and which is further deflected to enter passageways 54, impinges and coalesces in the baffle and flange surfaces in the above manner. Further, air vortices are established along portions of the air stream in the filter and grease droplets entrained in the vortex air are centrifugally flung outwardly to the baffle surfaces where they condense and coalesce. The grease flowing into the baffle members 32 flow by gravity toward the frame drain openings 25, and into the grease trough 14 from which it is removed.

The throttle grid 58 may be adjusted by screws 69, as described above, to compensate for differences in plenum pressure along the inside faces of the filter units 11.

While there has been described and illustrated a preferred embodiment of the present invention, it is apparent that numerous alterations, omissions and additions may be made without departing from the spirit thereof.

We claim:

1. A filter device for removing grease entrained in an air stream comprising a plurality of laterally spaced longitudinally extending pairs of laterally spaced first baffle panels (34), the baffle panels of each pair converging in a predetermined forward direction and delineating inlet passages (52) having enlarged rear inlet openings (50) and reduced outlet throats (51), the panel (34) of each inlet passage (52) having relatively outwardly laterally projecting first flanges (37) and a plurality of laterally spaced longitudinally extending pairs of laterally spaced second baffle panels (42), the second baffle panels of respective pairs diverging forwardly and delineating outlet passages (54) having rear inlet openings disposed laterally between said inlet passages (52) and forward outlets (57), and the adjacent converging second panels (42) of adjacent pairs of second panels being connected along their forward edges, said second panels (42) of each outlet passage having laterally outwardly projecting second flanges (43) spaced rearwardly of said first flanges, said first flanges (37) having free edges laterally spaced from corresponding second panels (42) to form respective first openings and said second flanges (43) having free edges laterally spaced from corresponding first panels (34) to form respective second openings laterally and rearwardly offset from said first openings whereby corresponding pairs of proximate first and second openings delineate sinuous intermediate passages interconnecting said inlet and outlet passages.

2. The filter device of claim 1 where said second panels of each pair thereof diverge from a reduced rear throat located between a pair of adjacent inlet passages to an enlarged forward opening.

3. The filter device of claim 2 wherein the adjacent first panels of successive pairs thereof converge rearwardly of each other and are joined to form first V-shaped baffle members, the legs of which are defined by said first panels which terminate in said first flanges which are relatively inwardly directed and coplanar.

4. The filter device of claim 3 wherein the adjacent second panels of successive pairs thereof converge forwardly of each other and are joined to form second inverted V-shaped baffle members, the legs of which define said second baffle panels which terminate in said second flanges, which are relatively, inwardly directed and coplanar.

5. The filter device of claim 4, including a rectangular mounting frame and at least one transversely extending first cross member supported by said frame and secured to said first baffle members at the apices thereof, and at least one transversely extending second cross member supported by said frame and secured to said second baffle members at the apices thereof.

6. The filter device of claim 5 wherein said frame member includes a laterally extending channel shaped transverse leg having drain openings along an edge thereof, the ends of said first baffle members registering with said channel shaped leg and extending short of the outer wall thereof.

7. The filter device of claim 1, including throttling means for adjustably restricting said inlet passages.

8. The filter device of claim 7 wherein said throttling means comprises a grid including laterally spaced longitudinally extending valve members, medially registering with said inlet passages and means for adjusting said grid to vary the positions of said valve members along the direction of said first passages.

9. The filter device of claim 8 wherein said valve members comprise longitudinally extending bars, said bars being differently adjustable and each of said bars being differently adjustable along the lengths thereof.

10. The filter device of claim 8 wherein said adjusting means includes adjusting members accessible at the exterior of said filter device.

* * * * *